United States Patent [19]

Tanrikut et al.

[11] 4,361,010
[45] Nov. 30, 1982

[54] COMBUSTOR LINER CONSTRUCTION

[75] Inventors: Ibrahim S. Tanrikut, Manchester; Walter B. Wagner, Bolton; Irwin Segalman, Bloomfield; Perry Goldberg, West Hartford, all of Conn.

[73] Assignee: United Technologies Corporation, Hartford, Conn.

[21] Appl. No.: 136,848

[22] Filed: Apr. 2, 1980

[51] Int. Cl.³ .................................................. F23R 3/42
[52] U.S. Cl. .......................................... 60/757; 60/760
[58] Field of Search ........................... 60/756, 757, 760

[56] References Cited

U.S. PATENT DOCUMENTS

| | | | |
|---|---|---|---|
| 3,064,424 | 11/1962 | Tomlinson | 60/757 |
| 3,333,414 | 8/1967 | Saintsbury | 60/760 |
| 3,572,031 | 3/1971 | Szetela | 60/757 |
| 3,869,864 | 3/1975 | Bunn | 60/757 |
| 3,898,797 | 8/1975 | Wood | 60/756 |

Primary Examiner—Robert E. Garrett
Attorney, Agent, or Firm—Norman Friedland

[57] ABSTRACT

This invention relates to an improved Finwall combustor liner that includes fabricating the liner in axially spaced panels of Finwall material and introducing the cooling air in each of said panels at discrete locations intermediate the ends thereof so as to achieve a parallel and counter flow for attaining substantially reduced axial and radial temperature gradient over the panels, with an overall temperature reduction of the entire liner.

5 Claims, 5 Drawing Figures

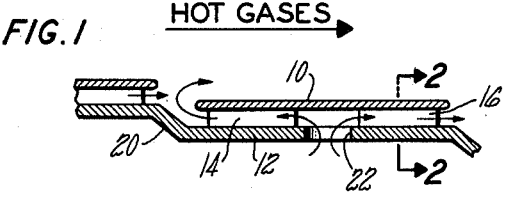
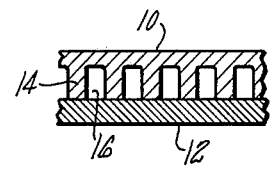
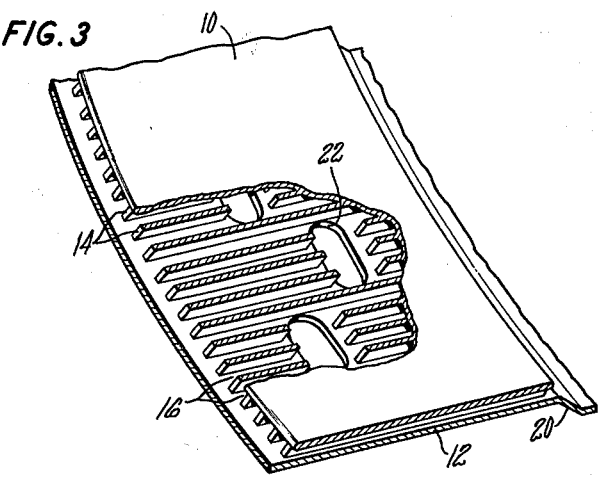
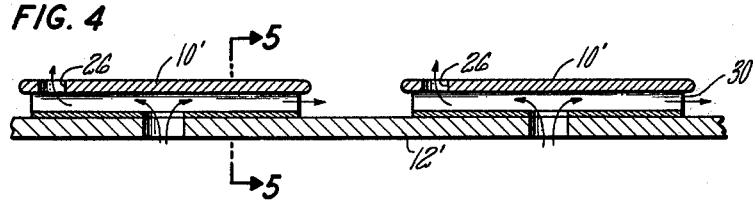
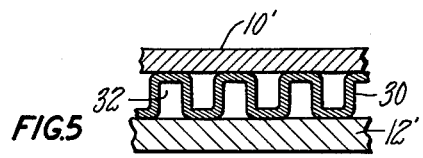

COMBUSTOR LINER CONSTRUCTION

CROSS REFERENCE

This invention is related to the invention disclosed in copending patent applications entitled COMBUSTOR LINER CONSTRUCTION FOR GAS TURBINE ENGINE and COMBUSTOR LINER CONSTRUCTION, filed by Thomas L. DuBell; and H. M. Craig, W. B. Wagner and W. J. Strock, respectively on even date and both assigned to the same assignee of this application.

TECHNICAL FIELD

This invention relates to combustor liners of gas turbine engines and particularly to liners constructed from Finwall ® material.

BACKGROUND ART

This invention constitutes an improvement over the liner configurations described in U.S. Pat. No. 3,706,203 granted to P. Goldberg and I. Segalman on Dec. 19, 1972 and U.S. Pat. No. 4,132,066 granted to G. W. Austin, Jr.; R. A. Breton; J. J. Nolan and E. E. Striebel on Jan. 2, 1979 and both of which are assigned to the assignee of this patent application. The liner as described in both of these patents exemplifies the liner construction currently being utilized, for example, in the TF-30 engine manufactured by Pratt and Whitney Aircraft Group of United Technologies Corporation, all of which are incorporated herein by reference and to which reference should be made for greater details of the construction of liners made from Finwall material. Suffice it to say that Finwall material is basically formed from either two or three pieces into panels having an inner wall and a radially spaced outer wall sandwiching either a third corrugated shell or radially depending walls defining a plurality of straight through passageways. Typically, the panels are joined at the relative ends in a louver type construction to form the liner defining the combustion chamber and the straight through passages are oriented parallel to the flow of combustion products in the combustion chamber. Because of the louver construction, each panel is radially spaced, exposing the upstream end to the cooling air coming from the compressor. Hence, the cooling air is admitted into the passageways at the upstream end and discharges at the downstream end thereof and as disclosed in the chart depicted in FIG. 4 of the 3,706,203 patent, supra, the axial temperature gradient of most of the panels vary considerably and may be as much as 500°-600° F. Temperature differences of this magnitude adversely affect the durability and longevity of the liner with a consequential influence on the time interval in which the liner has to be replaced.

Of significant importance the heretofore constructed liner of the type described above fabricated each panel so that the inlet of one panel was substantially in the plane of the exit of the next adjacent panel. Hence, to replace one panel, it was necessary to weld through the Finwall material, and with the state of the art welding techniques, such replacement necessitated electron beam welding.

Additionally, the heretofore known construction required that the combustion and dilution air holes pass through the Finwall material which necessitated utilizing grommets in the dilution air holes to insure continuity of upstream and downstream cooling air passageways. This not only contributed to the manufacturing complexity, but also required some means for assuring that downstream cooling air passageways did not become starved for cooling air and incur localized heating problems. For example, U.S. Pat. No. 4,132,066, supra, describes means for obviating these problems and discloses means for placing a downstream aperture in the liner wall to admit cooler air to flow counter and parallel to the combustion airflow so as to readmit cooler air on the downstream end of the grommet.

We have found that we can obviate the problems described in the above and fabricate a combustor liner utilizing Finwall material as the major portion of the liner and obtain a liner that has shown to have a higher use life than heretofore obtained as proven by actual tests with the same operating conditions of heretofore known liners. We have found that admitting the cooling air at discrete locations intermediate the ends of the Finwall panels so that a portion of air in the passageway flows counter and parallel to the combustion air, the temperature along the axial length remains substantially constant. The discharging air from adjacent panels impinge in a predescribed manner to induce a controlled film cooling effect in the space between adjacent Finwall panels also enhancing liner durability. We have found that not only does this liner panel construction reduce the axial panel temperature gradient but also reduces radial temperature gradients with a consequential reduction in the overall temperature level.

By virtue of the axially spaced Finwall panels, replacement of panels is facilitated by allowing the panel to be removed by cutting it out at the spaced intervals and inserting the new panel and with the use of a panel ring, fusion welding it in situ. This eliminates the need for the more complex and often unavailable electron beam welding which would heretofore be necessary in a multi-wall construction.

Since the dilution and combustion holes can be inserted in the spaced interval or transitional sections of the liner, the use of grommets and their attendant problems would be eliminated.

DISCLOSURE OF THE INVENTION

This invention comprises an improvement of combustor liners for gas turbine engines.

A feature of this invention is to provide combustor liners fabricated from axially spaced Finwall panels having its inlet for cooling air discretely located intermediate the upstream and downstream end for feeding the cooling air into the plurality of passageways so that a portion flows counter and parallel relative to the direction of the combustion products flow. Each panel being sufficiently spaced such that the transition zone is film cooled by the egressing flow from each adjacent panel. The spacing between panels providing sufficient room to cut away panels for replacement thereof.

The improved liner is characterized by its ease of maintainability and increased durability.

Other features and advantages will be apparent from the specification and claims and from the accompanying drawings which illustrate an embodiment of the invention.

BRIEF DESCRIPTION OF DRAWINGS

FIG. 1 is a partial sectional view showing a portion of the combustor liner;

FIG. 2 is a partial sectional view taken along line 2—2 of FIG. 1;

FIG. 3 is a partial view in perspective with a cutaway portion showing the bottom wall as viewed from the top wall;

FIG. 4 is a partial sectional view showing a portion of an alternate constructed combustion liner; and FIG. 5 is a sectional view taken along line 5—5 of FIG. 4.

BEST MODE FOR CARRYING OUT THE INVENTION

As can be seen from FIGS. 1-3 the burner liners formed from Finwall material comprise an inner wall 10 exposed to the hot gases of combustion in the combustion zone which flow in the direction indicated and the radially spaced outer wall 12. Obviously each wall is formed in a circular section to define the combustion zone. The particular shape will depend on the ultimate use, as for example, can burner, annular burner or a combination thereof. In its preferred embodiment, the inner wall 10 is a relatively narrow strip as compared to outer wall 12 which may be a single sheet shaped into the general burner liner envelope. Interposed or sandwiched between the inner wall 10 and outer wall 12 are circumferentially spaced depending walls 14 defining a plurality of open-ended passageways or channels 16 extending in an axial direction relative to the flow of combustion gases.

Since burners or combustors for jet engines are well known, and the particular combustor zone configurations are not essential to an understanding of this invention, for convenience and simplicity details are omitted herefrom and for further details reference should be made to the references referred to hereinabove. Suffice it to say that a plurality of axially spaced segments contain a plurality of axial open-ended passageways or channels 16 circumferentially spaced around the circumference of the liner. Each segment consists of inner wall 10, fins or depending walls 14 and the underlying portion of the outer wall 12. The position of the inner wall and outer wall are made with respect to the liner's center line (not shown).

As shown in FIG. 1, the outer wall 12 at the transition portion 20 between Finwall material sections may be jogged to form a somewhat louver type construction. For manufacturing simplicity the outer wall may be formed from flat stock, the inner wall and its depending walls may be joined thereto and the assembly may next be curved and bent into the final configuration.

Cooling air discharging from the compressor surrounds the burner liner in a well known manner. According to this invention, the cooling air is admitted into the cooling passageways of the liner through a plurality of apertures 22. It may be desirable to cut back a portion of depending walls 14 to define an annular chamber for good distribution of cooling air into all of the passageways. As shown in FIG. 1, the cooling air is directed to flow in both an upstream and downstream direction, parallel to and for some of the air, counter to the flow of combustion gases. The height, width and length of the passages are selected to provide sufficient velocity of the cooling air therein to assure optimum convective cooling with sufficient velocity component of the discharging cooling air to film cool the adjacent transition zone 20. As noted, the direction of the discharging cooling air from the passageways is such that the cooling air from adjacent panels impinges on each other. The direction and force of this discharging air is selected to provide additional cooling by virtue of the direction in which the resultant or merged stream of cooling air flows. The design considerations for taking advantage of these cooling aspects are within the state of the art in this technology. Although these considerations can be computed analytically, for the best design configuration a trail and error procedure may be adopted. Hence, it has been found that although the cooling air inlet aperture 22 is located intermediate the discharge ends of the passageways 16, its optimum location was something other than the mid-point.

FIG. 4 is similar design to the liner in FIGS. 1-3 where the jog in the outer or cold sheet is eliminated. In this instance a slot in the inner wall 10' discharges the counter flowing cooling air normal to the burner gaseous flow through aperture 26. In all other respects the liner is identical. It will be noted that the corrugated third sheet 30 defining the open-ended channels 32 as shown in FIG. 5 exemplifies this known Finwall material construction. Hence, corrugated sheet 30 is sandwiched between the outer wall 12' and inner wall 10'.

The advantages achieved by the liner construction described above includes:

Improved durability resulting from reduction in radial and axial panel temperature gradients in conjunction with reduction in overall temperature level.

Ease of repairability: failed panels can be replaced by insertion of panel rings in between transition sections and fusion welded in place. The necessity for electron beam welding, typical of previous multi-wall convective schemes, is eliminated.

Ease of installing combustion/dilution holes: combustion holes can be installed in the transition section. This eliminates utilization of grommets, which is typical in other multi-wall convective liner cooling configurations.

It should be understood that the invention is not limited to the particular embodiments shown and described herein, but that various changes and modifications may be made without departing from the spirit and scope of this novel concept as defined by the following claims.

We claim:

1. A liner for a combustor for a gas turbine engine comprising an outer wall generally configured in the shape of the combustor, a plurality of circumferentially mounted inner walls facing the combustion products radially disposed from said outer wall, interconnecting elements between said inner and outer walls defining generally longitudinal open ended channels aligned substantially with the flow of combustion products in the combustor, said inner and outer walls and the included interconnecting elements defining a liner segment, and each segment being axially spaced defining a transition zone, opening means formed in said outer wall intermediate the ends of each liner segment for leading compressor cooler air from the space surrounding said liner admitting air internally of said open ended channels so that a portion of the cooler air flows counter to and the remaining portion flow in the direction of the combustion products, the cooler air discharging in the upstream end of the open ended panels merging with the flow of cooler air discharging from the downstream end of the open ended channels of the next adjacent upstream segment, the flow of cooler air in said channels convectively cooling said liner walls and the flow of cooler air discharging from said open ended channels film cooling the outer wall at said transition zone and then the inner wall by flowing along the outside surface thereof.

2. A liner as defined in claim 1 wherein said transition zone is sufficiently wide to cut away the segment and replace it by a weldment unimpaired by adjacent segments.

3. A liner as defined in claim 1 wherein said interconnecting elements include corrugated fins sandwiched between the inner and outer walls.

4. A liner as defined in claim 1 wherein said interconnecting elements include depending walls parallelly spaced extending from one of said inner wall or said outer wall.

5. A liner as defined in claim 1 wherein said outer wall is stepped at the transition zone to define a generally louvered configured liner.

* * * * *